United States Patent
Siddiqui

(10) Patent No.: US 7,244,508 B2
(45) Date of Patent: Jul. 17, 2007

(54) FROSTING COATING MATERIALS, ARTICLES, AND METHODS

(75) Inventor: Sarfraz Ahmed Siddiqui, Pearland, TX (US)

(73) Assignee: Int'l Cellulose Corp.

( * ) Notice: Subject to any disclaimer, the term of this patent is extended or adjusted under 35 U.S.C. 154(b) by 198 days.

(21) Appl. No.: 11/136,871

(22) Filed: May 25, 2005

(65) Prior Publication Data

US 2006/0270797 A1 Nov. 30, 2006

(51) Int. Cl.
*C09D 133/00* (2006.01)
*C09D 161/28* (2006.01)

(52) U.S. Cl. .............. 428/522; 428/520; 525/174; 427/162

(58) Field of Classification Search .......... 428/520, 428/522; 525/174; 427/162
See application file for complete search history.

(56) References Cited

U.S. PATENT DOCUMENTS

| | | | |
|---|---|---|---|
| 3,983,307 A * | 9/1976 | Power et al. ............ 428/503 |
| 4,139,514 A * | 2/1979 | Bassett ................... 524/824 |
| 4,842,613 A | 6/1989 | Purser ...................... 8/471 |
| 4,892,906 A * | 1/1990 | Pham et al. ............. 524/730 |
| 5,006,578 A | 4/1991 | Masuda et al. .......... 524/128 |
| 5,271,768 A | 12/1993 | Morishima et al. .... 106/287.16 |
| 5,328,975 A | 7/1994 | Hanson et al. ............ 528/29 |
| 5,520,952 A | 5/1996 | Tanitsu et al. ............. 427/58 |
| 5,916,938 A | 6/1999 | Brunnemann et al. .... 524/128 |
| 6,193,831 B1 | 2/2001 | Overcash et al. ......... 156/230 |
| 6,476,093 B1 | 11/2002 | Araki et al. ............... 522/83 |
| 6,641,755 B2 | 11/2003 | Tomoike et al. |
| 6,777,092 B1 | 8/2004 | Hayashi et al. |
| 6,899,958 B2 | 5/2005 | Bayless |
| 2003/0150729 A1 * | 8/2003 | Retzlaff et al. ........... 204/489 |
| 2004/0049052 A1 | 3/2004 | Reinehr .................... 548/217 |
| 2004/0058078 A1 | 3/2004 | Stevenson et al. ...... 427/385.5 |
| 2004/0067311 A1 | 4/2004 | Baudin et al. ............ 427/310 |
| 2006/0047051 A1 * | 3/2006 | Ma et al. .................. 524/492 |

FOREIGN PATENT DOCUMENTS

| EP | 1024180 | 12/1998 |
|---|---|---|
| JP | 9-272778 | * 10/1997 |

* cited by examiner

*Primary Examiner*—D. Lawrence Tarazano
(74) *Attorney, Agent, or Firm*—Guy McClung

(57) ABSTRACT

Frosting coating materials and methods, frosted articles, and, in certain aspects, a frosting coating that includes thermoset acrylic resin, polymethyl methacrylate, polyacrylate copolymer and methylated melamine-formaldehyde resin, and, optionally, UV absorbent material and/or light stabilized material.

20 Claims, No Drawings

FROSTING COATING MATERIALS, ARTICLES, AND METHODS

BACKGROUND OF THE INVENTION

1. Field of the Invention

The present invention is directed to frosting coating materials, coated articles, coating methods, and, in certain particular aspects, to coating methods and materials useful in producing a frosted plastic or glass article.

2. Description of Related Art

A substrate of glass or plastic may become frosted when a surface temperature thereof is heated, e.g. to 355-365 degrees F. and then cooled to room temperature. In certain prior art methods, a frosting coating is provided with, e.g. thermosetting polymers and other chemicals which produce a frosting effect due to moisture adjustment (expulsion) by heating. The prior art discloses a wide variety of systems and methods for coating articles to produce a frosted article. U.S. Pat. Nos. 6,476,093; 6,777,092; 6,641,755; 5,916,938; 6,193,831; U.S. Applications published with numbers 20040049052, 20040058078, and 20040067311; and the references listed in these patents and applications provide a sampling of related art and of frosted articles (e.g. lenses, U.S. Pat. Nos. 5,015,523 and 5,458,820; mirrors and prisms, U.S. Pat. Nos. 4,898,435 and 5,513,039; and optical elements, U.S. Pat. Nos. 6,582,884, 5,933,273, and 5,621,838).

Frosted articles and frosted glass plastic containers are well known and are used for foods, beverages, alcoholic liquors, cosmetics and other materials because they prevent UV transmission and/or improve a design with decoration and an impression of quality or artistry. In many prior art methods, to finish a surface of a glass container so it is frosted, a method is used in which the surface is etched with a hydrofluoric acid solution with added salts such as ammonium fluoride, or a mixed solution of hydrofluoric acid and sulfuric acid with added salts such as ammonium fluoride. Such a method can provide a frosted surface, but the use of a strong acid, such as hydrofluoric acid as an etching agent, can make the handling of agents difficult and can require washing with an acid and water. The treatment of resulting acidic waste water can present problems regarding safety, environment, productivity, and cost.

A method for finishing a surface of a glass container without using such harmful agents includes mixing a fine silica particle as a matting agent into a thermosetting resin or a photocurable resin to form a frosted coating on the surface of the glass container (see, e.g. JP-A 2518/1978 and JP-B 68418/1993); but when such a frosted glass container is immersed into a washing solution such as an aqueous sodium hydroxide solution in a step of alkali washing, the coating can turn white and can peel from the container and, when such a glass container passes through an alkali washing line or a bottling line, cracking and peeling of the coating can occur by collision between bottles due to insufficient impact resistance of the coating.

One attempted solution to these problems disclosed in U.S. Pat. No. 6,476,093 is a frost-coating composition, which includes a hydrophobic silica particle or a polymer particle, in addition to a photocurable compound; and a frosted glass container coated with such a composition.

One such frost-coating composition includes 5-50 parts by weight of a hydrophobic fine silica particle based on 100 parts by weight of a photocurable compound, such that said frost-coating composition forms a frosted coating having alkaline resistance.

Certain coatings of U.S. Pat. No. 6,476,093 include a solvent-based solution with a relatively high VOC content and, in certain manufacturing processes an epoxy polymer solution is heated for a minimum of two hours at one hundred fifty degrees centigrade.

There is a need, recognized by the present inventor, for efficient and effective materials and methods for frosting coatings.

There is a need, recognized by the present inventor, for such frosting coating materials and methods useful for producing a coating with high surface hardness to combat undesirable etching, e.g. acid etching, of an article.

SUMMARY OF THE PRESENT INVENTION

The present invention discloses, in certain aspects, frosting coatings, methods for producing them, and articles with such coatings. In certain aspects, a frosting coating material according to the present invention forms an insoluble coating film that is hydrophobic; permanent; resistant to mild acids, alkalis, alcohols, abrasion, and scratching; excellent in surface hardness; and, optionally, UV absorbent and/or light stabilized. Such coatings according to the present invention may be used on plastic or glass substrates, such as glasses, wine bottles, jars, containers, laminated glass or plastic (e.g., in the architectural, cosmetic, pharmaceutical and food industries) lenses, optical parallel plates, optical mirrors, optical elements, prisms, glass articles, and/or plastic articles; and/or for decoration on such items; and/or to produce frosted objects as disclosed in the patents and patent application references previously incorporated herein by reference.

In certain aspects, the present invention provides a coating material for a frosting coating film that is hydrophobic; permanent; resistant to mild acids, alkalis, alcohols, abrasion, and scratching; UV light absorbent; and excellent in surface hardness.

In certain aspects, the present invention provides frosted articles with a coating film according to the present invention.

In addition to specific objects stated herein for at least certain embodiments of the invention (but not necessarily for all embodiments of the present invention), other objects and purposes will be readily apparent to one of skill in this art who has the benefit of this invention's teachings and disclosures. It is, therefore, an object of at least certain preferred embodiments of the present invention to provide new, unique, useful, and nonobvious frosting coating materials, frosting coating films, methods to produce them and frosted articles with such a coating—all of which are not anticipated by, rendered obvious by, suggested by, or even implied by any of the prior art, either alone or in any possible legal combination.

Certain embodiments of this invention are not limited to any particular individual feature disclosed here, but include combinations of them distinguished from the prior art in their materials, components, structures and functions. Additional aspects of the invention are described below and may be included in the subject matter of the claims to this invention. Those skilled in the art who have the benefit of this invention, its teachings, and suggestions will appreciate that the conceptions of this disclosure may be used as a creative basis for designing other materials, articles, structures, methods and systems for carrying out and practicing the present invention. The claims of this invention are to be read to include any legally equivalent materials, articles, or subject matter.

The present invention recognizes and addresses the previously-mentioned problems and needs and provides a solution to those problems and a satisfactory meeting of those needs. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

The Abstract that is part hereof is to enable the United States Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention in any way.

DESCRIPTION OF EMBODIMENTS PREFERRED AT THE TIME OF FILING FOR THIS PATENT

In one particular embodiment of a system and method according to the present invention, there is provided a frosting coating material or composition with: thermoset acrylic resin; polymethyl methacrylate, N,N-dimethylethanolamine (DMEA); polysiloxanes; 2-methoxymethylthoxypropanol (DPM); emulsion of wax; water based polyamide solution; methylated melamine-formaldehyde resins; and alkoxylated alcohol. The coating material may further contain hydroxyphenyl benzotriazol, bis(1,2,2,6,6-pentamethyl-4-piperidnyl)sebacate and methyl(1,2,2,6,6-pentamethyl-4-piperidnyl)sebacate. The hydroxyphenyl benzotriazol, bis(1,2,2,6,6-pentamethyl-4-piperidnyl)sebacate and methyl(1,2,2,6,6-pentamethyl-4-piperidnyl)sebacate may preferably be used in 2-3 wt. parts (as solid) per 100 wt. parts (as solid) of the total of the thermoset acrylic resin material.

In one aspect a frosted article according to the present invention is prepared by blending components of the frosting coating material to form a cloudy coating liquid. Then, the coating liquid is applied onto at least one surface of a substrate (e.g. of a glass or plastic item) and dried to a cured coating solution under heating in an oven, e.g. for at least ten minutes at a temperature of at least 350° F., or in a temperature range between 350-375° F. to provide a frosted article according to the present invention. Such a coating may be 0.002 inches thick. Such coating may be repeated several times, as desired, to provide an increased thickness of the coating film, with or without heating after each application. The heating may also be performed after several coating applications.

Coating films according to certain aspects of the present invention may have a thickness of between 0.001-0.020 inches, e.g., but not limited to, for a cosmetic bottle between 0.001-0.010 inches and e.g. for window panels between 0.010-0.020 inches. The coating film thickness may be adjusted appropriately by applying a thinner or thicker layer of the coating liquid or by repeatedly applying the coating liquid in superposed applications.

In one preferred embodiment of the frosting coating material according to the present invention, N,N-dimethylethanolamine (DMEA), methylated melamine-formaldehyde resin is mixed with water to form (e.g. agitated for 5 minutes) a uniform coating mixture liquid. Then polysiloxanes, emulsion of wax, water based polyamide solution, alkoxylated alcohol and polymethyl methacrylate are added, preferably with continuous high speed mixing, e.g. using a five horsepower floor-mounted electric-powered high speed dispenser running at a speed of 2500 rpm. The mixing speed is reduced (e.g. to 1200 rpm) and thermoset acrylic resin is added. For UV light absorbence properties hydroxyphenyl benzotriazol, bis(1,2,2,6,6-pentamethyl-4-piperidnyl)sebacate and methyl(1,2,2,6,6-pentamethyl-4-piperidnyl)sebacate are added to the uniform coating mixture liquid, which may be dried to provide a uniform film layer through uniform drying.

In another embodiment of the frosting coating material according to the present invention, N,N-dimethylethanolamine (DMEA), methylated melamine-formaldehyde resin, water, polysiloxanes, emulsion of wax, water based polyamide solution, alkoxylated alcohol and polymethyl methacrylate are added (to water) with, optionally, continuous high speed mixing. The mixing speed is reduced to low, followed by the addition of the thermoset acrylic resin. For UV light absorbence properties hydroxyphenyl benzotriazol, bis(1,2,2,6,6-pentamethyl-4-piperidnyl)sebacate and methyl (1,2,2,6,6-pentamethyl-4-piperidnyl)sebacate are added to the uniform coating mixture liquid, which may be dried to provide a uniform film layer through uniform drying.

In one particular embodiment—"Embodiment A"—according to the present invention, a coating liquid has, by weight:
  N,N-dimethylethanolamine (DMEA) 3.61 wt. parts,
  methylated melamine-formaldehyde resin 2.77 wt. parts,
  water 60.94 wt. parts,
  silicone solution 0.48 wt. parts {18.5 wt. % solution of polysiloxane in 81.5 wt. % of 2-methoxy methyl ethoxy propanol (DPM)},
  polyacrylate copolymer solution 0.48 wt. parts {52.0 wt % solution of polyacrylate copolymer in 48.0 wt. % of 2-methoxy methyl ethoxy propanol (DPM)},
  alkoxylated alcohol 0.48 wt. parts,
  polymethyl methacrylate 4.81 wt. parts,
  emulsion of wax 2.72 wt. parts (95.0 wt. % solution of non-ionic carnauba wax in 5.0 wt. % of butyl cellosolve)
  polyamide aqueous solution 1.81 wt. parts (20.0 wt. % solution of polyamide-based thixotrope in 7.0 wt. % propylene glycol mono methyl ether and 73.0 wt. % water),
  clear water reducible thermosetting acrylic emulsion 21.90 wt. parts {75.0 wt. % in solvent (butoxyethanol/ n-butanol 83/17, acid value on solid=56%, hydroxyl number on solids=54)}.

A coating liquid was prepared with the components as in Embodiment A. N,N-dimethylethanolamine (DMEA) 3.61 wt. parts, methylated melamine-formaldehyde resin 2.77 wt. parts, water 60.94 wt. parts, polysiloxane solution 0.48 wt. parts, polyacrylate copolymer solution 0.48 wt. parts, alkoxylated alcohol 0.48 wt. parts, polymethyl methacrylate 4.81 wt. parts, emulsion of carnauba wax 2.70 wt. parts, polyamide aqueous solution 1.81 wt. parts were mixed together for 30 minutes at room temperature (in one aspect, at about 77° F. or about 25° C.) and the resultant mixture was further stirred for 10 min. at room temperature followed by the addition of clear water reducible thermosetting acrylic emulsion 21.86 wt. parts, stirred for 15 minutes at ambient temperature, to produce a coating liquid ("coating liquid A"). This coating liquid was clear and was applied onto a glass panel by spraying, followed by 10 min. of drying in a conventional oven at 350° F. (177° C.) providing a uniform, colorless and clear coating film with a thickness of several thicknesses (from 0.005-0.010 inches). In another aspect, the thus-prepared coating liquid A was clear and applied onto a glass panel by brushing, followed by 10 minutes of drying in a conventional oven at 350° F. (177° C.), providing a uniform, colorless and clear coating film having a thickness of several thicknesses (from 0.005-0.010 inches).

In another aspect this thus-prepared coating liquid A was clear and was applied onto a glass panel by spraying, followed by 3.0 minutes of drying in a conventional infrared oven at 350° F. (177° C.), providing a uniform, colorless and clear coating film having a thickness of several thicknesses (from 0.005-0.010 inches).

In another aspect the thus-prepared coating liquid A was clear and applied onto a glass panel by brushing, followed by 3.0 minutes of drying in a conventional infrared oven at 350° F. (177° C.), providing a uniform, colorless and clear coating film having a thickness of several thicknesses (from 0.005-0.010 inches).

Such coated glass panels were then left standing in an environment of ambient temperature for 5.0 minutes for cooling.

The following tests were performed for these coated panels: Tape adhesion as per ASTM D3359, Method A (X-cut tape test); Pencil hardness as per ASTM D3363: Abrasion resistance as per ASTM D4060; Accelerated weathering as per ASTM G23, ASTM G26 and ASTM G53; Corrosion resistance by Salt fog method as per ASTM B117; Humidity as per ASTM D2247 and D4585; and Chemical resistance using different chemicals. Test results were:

Adhesion Test

According to ASTM D-3359, apply approximately 25×12 nm of an adhesive tape was applied to the coated Aqua-222, Aqua-333UV and Aqua-444UV surface. After the snap removal (normal to surface) of the tape, no deterioration of the coating was visible with unaided eye under normal illumination.

Abrasion Test

According to ASTM D-4060 by using the equipment manufactured by Taber Instrument (Model 5130), the coated surface which can be turned on a vertical axis is contacted by two abrading wheels (Hardness: CS-10) under the load of 500 g, the coated sample is then driven to turn. After 20 circles, the coated surface does not show any evidence of damage or coating removal with unaided eye under normal illumination.

Solubility Test

The coated glass was immersed into salt water (concentration: 45 g/l) for 24 hours at room temperature. After being washed with distilled water and dried up with soft cloth, the coating showed no evidence of flaking, peeling, cracking or blistering with unaided eye under normal illumination.

Humidity Test

The coated glass was exposed to an atmosphere of 90-95% relative humidity and 55° C. for 16 hours. No deterioration of the coating was visible with unaided eye under normal illumination.

Chemical Durability Test (ASTM D-1308)

With unaided eye under normal illumination, the coating showed no evidence of deterioration after one of the following agents remained on the coated surface for more than 24 hours: Agents—Acetone; Methanol alcohol; Isopropanol alcohol; Glass polishing agent (A1302) Stamping ink; Permanent marker; Tea; Coffee; Chocolate; Glass cleaning detergents (Ajax).

Salt Spray (fog) Resistance: Also known as salt fog testing is generally conducted according to ASTM B-117. The aqua coated glass samples were prepared and suspended in a sealed chamber where they were subjected to a spray or fog of a neutral 5% salt solution atomized at a temperature of 95° F. No deterioration of the coating was visible with unaided eye under normal illumination.

QUV Accelerated Weathering (ASTM F-883): This test reproduces the damage caused by sunlight, rain and dew. The aqua coated glass samples were prepared and placed in a chamber where they were exposed to alternating cycles of light and moisture at controlled, elevated temperatures. The QUV simulates the effect of sunlight with fluorescent ultraviolet lamps. The test simulates dew and rain with condensing humidity and water sprays.

No deterioration of the coating was visible with unaided eye under normal illumination One particular embodiment of a coating liquid according to the present invention—"Embodiment B"—has, by weight:

N,N-dimethylethanolamine (DMEA) 3.58 wt. parts,
methylated melamine-formaldehyde resin 2.75 wt. parts,
water 60.50 wt. parts,
silicone solution 0.47 wt. parts {18.5 wt. % solution of polysiloxane in 81.5 wt. % of 2-methoxy methyl ethoxy propanol (DPM)},
polyacrylate copolymer solution 0.47 wt. parts {52.0 wt % solution of polyacrylate copolymer in 48.0 wt. % of 2-methoxy methyl ethoxy propanol (DPM)},
alkoxylated alcohol 0.47 wt. parts,
polymethyl methacrylate 4.78 wt. parts,
emulsion of wax 2.70 wt. parts (95.0 wt. % solution of non-ionic carnauba wax in 5.0 wt. % of butyl cellosolve)
polyamide aqueous solution 1.80 wt. parts (20.0 wt. % solution of polyamide-based thixotrope in 7.0 wt. % propylene glycol mono methyl ether and 73.0 wt. % water),
UV absorber 0.44 wt. parts (50.0 wt. % α-[3-[3-(2H-Benzotriazol-2-yl)-5-(1,1-dimethylethyl)-4-hydroxyphenyl]-1-oxopropyl]-hydroxypoly(oxo-1,2-ethanediyl), 38.0 wt. % α-[3-[3-(2H-Benzotriazol-2-yl)-5-(1,1-dimethylethyl)-4-hydroxyphenyl]-1-oxopropyl]-ω-[3-[3-(2H-benzotriazol-2-yl)-5-(1,1-dimethylethyl)-4-hydroxyphenyl]-1-oxopropoxy]poly(oxy-1,2-ethanediyl); 12.0 wt. % polyethyleneglycol 300,
light stabilizer 0.30 wt parts (50.0 wt. % bis(1,2,2,6,6-pentamethyl-4-piperidinyl)sebacate, 50.0 wt. % Methyl (1,2,2,6,6-pentamethyl-4-piperidinyl)sebacate),
clear water reducible thermosetting acrylic emulsion 21.74 wt. parts {75.0 wt. % in solvent (butoxyethanol/n-butanol 83/17, acid value on solid=56%, hydroxyl number on solids=54)}.

A coating liquid was prepared with these components as in Embodiment B. N,N-dimethylethanolamine (DMEA) 3.58 wt. parts, methylated melamine-formaldehyde resin 2.75 wt. parts, water 60.50 wt. parts, polysiloxane solution 0.47 wt. parts, polyacrylate copolymer solution 0.47 wt. parts, alkoxylated alcohol 0.47 wt. parts, polymethyl methacrylate 4.78 wt. parts, emulsion of carnauba wax 2.70 wt. parts, polyamide aqueous solution 1.80 wt. parts, UV absorber 0.44 wt. parts, light stabilizer 0.30 wt. parts were mixed together, and the resultant mixture was further stirred for 10 min. at room temperature (in one aspect, at about 77° F. or about 25° C.), followed by the addition of clear water reducible thermosetting acrylic emulsion 21.74 wt. parts and 15 minutes of stirring at ambient temperature, producing a coating liquid ("coating liquid B").

Such a coating liquid B was clear and was applied onto a glass panel by spraying, followed by 10 minutes of drying in a conventional oven at 350° F. (177° C.), providing a uniform, colorless and clear coating film having a thickness of several thicknesses (from 0.005-0.010 inches).

Such a coating liquid B was clear and was applied onto a glass panel by brushing, followed by 10 minutes of drying in a conventional oven at 350° F. (177° C.), providing a uniform, colorless and clear coating film having a thickness of several thicknesses (from 0.005-0.010 inches).

Such a coating liquid B was clear and was applied onto a glass panel by spraying, followed by 3.0 minutes of drying in a conventional infrared oven at 350° F. (177° C.), providing a uniform, colorless and clear coating film having a thickness of several thicknesses (from 0.005-0.010 inches).

Such a coating liquid B was clear and applied onto a glass panel by brushing, followed by 3.0 minutes of drying in a conventional infrared oven at 350° F. (177° C.), providing a uniform, colorless and clear coating film having a thickness of several thicknesses (from 0.005-0.010 inches).

Such coated glass panels were then left standing in an environment of ambient temperature for 5.0 minutes for cooling.

The following tests were performed for these coated panels: Tape adhesion as per ASTM D3359, Method A (X-cut tape test); Pencil hardness as per ASTM D3363; Abrasion resistance as per ASTM D4060; Accelerated weathering as per ASTM G23, ASTM G26 and ASTM G53; Corrosion resistance by Salt fog method as per ASTM B117; Humidity as per ASTM D2247 and D4585; and Chemical resistance using different chemicals. Test results were:

Adhesion Test

According to ASTM D-3359, approximately 25×12 nm of an adhesive tape was applied to the coated Aqua-222, Aqua-333UV and Aqua-444UV surface, after the snap removal (normal to surface) of the tape, no deterioration of the coating was visible with unaided eye under normal illumination.

Abrasion Test

According to ASTM D-4060 by using the equipment manufactured by Taber Instrument (Model 5130), the coated surface which can be turned on a vertical axis was contacted by two abrading wheels (Hardness: CS-10) under the load of 500 g, the coated sample was then driven to turn. After 20 circles, the coated surface did not show any evidence of damage or coating removal with unaided eye under normal illumination.

Solubility Test

The coated glass was immersed to salt water (concentration: 45 g/l) for 24 hours at room temperature. After being washed with DI water and dried up with soft cloth, the coating showed no evidence of flaking, peeling, cracking or blistering with unaided eye under normal illumination.

Humidity Test

The coated glass is exposed to an atmosphere of 90-95% relative humidity and 55° C. for 16 hours. No deterioration of the coating was visible with unaided eye under normal illumination.

Chemical Durability Test (ASTM D-1308)

With unaided eye under normal illumination, the coating showed no evidence of deterioration after one of the following agents remained on the coated surface for more than 24 hours.

Agents: Acetone; Methanol alcohol; Isopropanol alcohol; Glass polishing agent (A1302) Stamping ink; Permanent marker; Tea; Coffee; Chocolate; Glass cleaning detergents (Ajax).

Salt Spray (fog) Resistance: Also known as salt fog testing is generally conducted according to ASTM B-117. The aqua coated glass samples were prepared and suspended in a sealed chamber where they were subjected to a spray or fog of a neutral 5% salt solution atomized at a temperature of 95° F. No deterioration of the coating was visible with unaided eye under normal illumination.

QUV Accelerated Weathering (ASTM F-883) This test reproduces the damage caused by sunlight, rain and dew. The aqua coated glass samples were prepared and placed in a chamber where they were exposed to alternating cycles of light and moisture at controlled, elevated temperatures. The QUV simulates the effect of sunlight with fluorescent ultraviolet lamps. The test simulates dew and rain with condensing humidity and water sprays. No deterioration of the coating was visible with unaided eye under normal illumination.

The present invention provides a frosted article with: a substrate and a coating film formed on the substrate (any coating disclosed herein), e.g., but not limited to, a coating formed by application of a solution containing a thermoset acrylic resin, polymethyl methacrylate, N,N-dimethylethanolamine (DMEA), polysiloxanes, 2-methoxymethylthoxypropanol (DPM), emulsion of wax, water based polyamide solution, methylated melamine-formaldehyde resins and alkoxylated alcohol and, optionally, hydroxyphenyl benzotriazol, bis(1,2,2,6,6-pentamethyl-4-piperidnyl)sebacate and/or methyl(1,2,2,6,6-pentamethyl-4-piperidnyl)sebacate. These coatings can be applied by spraying, e.g. with a High Volume Low Pressure (HVLP) unit, e.g. a Campbell Hausfeld HVLP Spray gun; and/or they can be brushed on with a typical paint brush or paint roller.

In certain aspects a frosting coating film formed of the frosting coating material according to the present invention is water-insoluble, and has a high surface hardness and excellent durability. Without being tied to any specific theory, process or mechanism, it is noted that such properties in certain aspects according to the present invention may be attributable to an improved mutual solubility between the thermoset acrylic resin, polymethyl methacrylate, N,N-dimethylethanolamine (DMEA), and methylated melamine-formaldehyde resin. More specifically, a thermoset acrylic resin compound and methylated melamine-formaldehyde resin form a uniform coating film. The coating film is hard, excellent in durability and water-insoluble. This is presumably because the improved mutual solubility between the polyacrylic resin compound and methylated melamine-formaldehyde resin promotes mutual interaction of polymer chains of these compounds to provide an insoluble coating film.

The present invention, therefore, in at least some, but not necessarily all embodiments, provides a frosting coating material including thermoset acrylic resin, polymethyl methacrylate, polyacrylate copolymer and methylated melamine-formaldehyde resin, and, in one aspect, the frosting coating material including UV absorbent material and/or light stabilizing material.

All patents and patent applications referred to herein by number are incorporated fully herein for all purposes. In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A frosting coating composition comprising thermoset acrylic resin, polymethyl methacrylate, polyacrylate copolymer and methylated melamine-formaldehyde resin.

2. The frosting coating composition of claim 1, further comprising a solvent comprising N,N-dimethylethanolamine (DMEA) and water.

3. The frosting coating composition of claim 1, wherein said thermoset acrylic resin comprises at least one member selected from the group consisting of polyacrylic resin and polymethacrylic resin.

4. The frosting coating composition of claim 1 further comprising UV absorbent material.

5. The frosting coating composition of claim 4 wherein the UV absorbent material is hydroxyphenyl benzotriazol and hindered amine light stabilizer bis(1,2,2,6,6-pentamethyl-4-piperidnyl)sebacate and methyl(1,2,2,6,6-pentamethyl-4-piperidnyl)sebacate.

6. The frosting coating composition of claim 2 wherein the thermoset acrylic resin is present in an emulsion and wherein each component is present by weight parts as

| | |
|---|---|
| thermoset acrylic resin emulsion | 21.90 |
| polymethyl methacrylate | 4.81 |
| polyacrylate copolymer | 0.48 |
| methylated melamine-formaldehyde resin | 2.77 |
| N,N-dimethylethanolamine | 3.61 |
| Water | 60.94. |

7. The frosting coating composition of claim 2 further comprising
silicone solution,
alkoxylated alcohol,
polyamide aqueous solution, and
emulsion of wax.

8. The frosting coating composition of claim 7 wherein components are present by weight parts as

| | |
|---|---|
| silicone solution | 0.48 |
| alkoxylated alcohol | 0.48 |
| polyamide aqueous solution | 1.81 |
| emulsion of wax | 2.72. |

9. The frosting coating composition of claim 2 further comprising
silicone solution,
alkoxylated alcohol,
polyamide aqueous solution,
emulsion of wax,
light stabilizer, and
UV absorber.

10. The frosting coating composition of claim 9 wherein the thermoset acrylic resin is present in an emulsion and wherein components are present by weight parts of a total of 100 weight parts as
N,N-dimethylethanolamine (DMEA) 3.58 wt. parts,
methylated melamine-formaldehyde resin 2.75 wt. parts,
water 60.50 wt. parts,
silicone solution 0.47 wt. parts,
polyacrylate copolymer solution 0.47 wt. parts,
alkoxylated alcohol 0.47 wt. parts,
polymethyl methacrylate 4.78 wt. parts,
emulsion of wax 2.70 wt. parts,
polyamide aqueous solution 1.80 wt. parts,
UV absorber 0.44 wt. parts,
light stabilizer 0.30 wt parts,
thermoset acrylic resin emulsion 21.74 wt. parts.

11. A solid frosted article comprising
a substrate,
a film formed on the substrate, the film comprising a frosting coating, and
the frosting coating comprising thermoset acrylic resin, polymethyl methacrylate, polyacrylate copolymer, and methylated melamine-formaldehyde resin.

12. The solid frosted article of claim 11 wherein the frosting coating further comprises N,N-dimethylethanolamine (DMEA).

13. The solid frosted article of claim 11 wherein the frosting coating further comprises UV absorbent material.

14. The solid frosted article of claim 13 wherein the UV absorbent material is hydroxyphenyl benzotriazol and hindered amine light stabilizer bis(1,2,2,6,6-pentamethyl-4-piperidnyl)sebacate and methyl(1,2,2,6,6-pentamethyl-4-piperidnyl)sebacate.

15. The solid frosted article of claim 11 wherein the substrate is a member selected from the group consisting of lenses, optical parallel plates, mirrors, prisms, glass articles and plastic articles.

16. The solid frosted article of claim 12 wherein components of the frosting coating are present by weight parts as

| | |
|---|---|
| polymethyl methacrylate | 4.81 |
| polyacrylate copolymer | 0.48 |
| methylated melamine-formaldehyde resin | 2.77 |
| N,N-dimethylethanolamine | 3.61. |

17. The solid frosted article of claim 12 wherein the frosting coating further comprises
alkoxylated alcohol, and emulsion of wax.

18. The solid frosted article of claim 17 wherein components of the frosting coating are present by weight parts of each 100 parts as

| | |
|---|---|
| alkoxylated alcohol | 0.48 |
| polyamide aqueous solution | 1.81 |
| emulsion of wax | 2.72. |

19. The solid frosted article of claim 12 wherein the frosting coating includes
 alkoxylated alcohol,
 emulsion of wax,
 UV absorber, and
 light stabilizer.

20. A method for frosting a solid object, the method comprising
 applying a frosting coating composition to an object, the frosting coating composition comprising thermoset acrylic resin, polymethyl methacrylate, polyacrylate copolymer, and methylated melamine-formaldehyde resin.

* * * * *